(12) United States Patent
Li (10) Patent No.: US 11,449,919 B2
(45) Date of Patent: Sep. 20, 2022

(54) COMMODITY RECOMMENDATION METHOD AND COMMODITY RECOMMENDATION DEVICE

(71) Applicant: BOE TECHNOLOGY GROUP CO., LTD., Beijing (CN)

(72) Inventor: Hui Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 301 days.

(21) Appl. No.: 16/500,656

(22) PCT Filed: Mar. 25, 2019

(86) PCT No.: PCT/CN2019/079433
§ 371 (c)(1),
(2) Date: Oct. 3, 2019

(87) PCT Pub. No.: WO2020/001096
PCT Pub. Date: Jan. 2, 2020

(65) Prior Publication Data
US 2021/0334875 A1  Oct. 28, 2021

(30) Foreign Application Priority Data

Jun. 29, 2018 (CN) .......................... 201810699571.7

(51) Int. Cl.
*G06Q 30/06* (2012.01)
*G06N 20/00* (2019.01)
(Continued)

(52) U.S. Cl.
CPC .......... *G06Q 30/0631* (2013.01); *G06N 5/04* (2013.01); *G06N 20/00* (2019.01); *G06Q 30/0205* (2013.01); *G06Q 30/0639* (2013.01)

(58) Field of Classification Search
CPC .......... G06Q 30/0631; G06Q 30/0205; G06Q 30/0639; G06N 20/00; G06N 5/04
(Continued)

(56) References Cited

U.S. PATENT DOCUMENTS

2004/0111454 A1* 6/2004 Sorensen ........... G06Q 30/0201
708/200
2013/0282520 A1* 10/2013 Tapley ............... G06Q 30/0639
705/26.8
(Continued)

FOREIGN PATENT DOCUMENTS

| CN | 103400291 A | 11/2013 |
|---|---|---|
| CN | 103544632 A | 1/2014 |

(Continued)

OTHER PUBLICATIONS

RFID study tracks supermarket shopper pattern. Anonymous. Drug Store News. New York: Jun. 6, 2005. vol. 27, Iss. 8; p. 6, 1 pgs.*
(Continued)

*Primary Examiner* — Timothy Padot
(74) *Attorney, Agent, or Firm* — Myers Bigel, P.A.

(57) ABSTRACT

A commodity recommendation method and a commodity recommendation device are disclosed. The commodity recommendation method includes receiving location information of a user to whom the commodity is to be recommended, performing commodity recommendation according to the location information of the user to whom the commodity is to be recommended, and sending the recommended commodity information to the user to whom the commodity is to be recommended. This location-based commodity recommendation method can more accurately meet user requirements while improve the convenience of shopping.

16 Claims, 4 Drawing Sheets

(51) Int. Cl.
*G06N 5/04* (2006.01)
*G06Q 30/02* (2012.01)

(58) Field of Classification Search
USPC ........................................ 705/7.34
See application file for complete search history.

(56) References Cited

U.S. PATENT DOCUMENTS

| | | | | |
|---|---|---|---|---|
| 2015/0052003 | A1* | 2/2015 | Tang | G06Q 30/0631 |
| | | | | 705/26.7 |
| 2015/0186920 | A1* | 7/2015 | Sayler | G06Q 30/0229 |
| | | | | 705/14.39 |
| 2015/0324812 | A1* | 11/2015 | Wang | G06Q 30/0201 |
| | | | | 455/456.1 |
| 2016/0150378 | A1 | 5/2016 | Cui | |
| 2016/0179199 | A1* | 6/2016 | Levesque | G06F 3/016 |
| | | | | 340/407.2 |

FOREIGN PATENT DOCUMENTS

| | | |
|---|---|---|
| CN | 104811899 A | 7/2015 |
| CN | 105302916 A | 2/2016 |
| CN | 105975578 A | 9/2016 |
| CN | 106504037 A | 3/2017 |
| CN | 106570722 A | 4/2017 |
| CN | 106709764 A | 5/2017 |
| CN | 107180378 A | 9/2017 |
| CN | 107481114 A | 12/2017 |
| CN | 107657007 A | 2/2018 |

OTHER PUBLICATIONS

A comparative study of location-based recommendation systems. Faisal Rehman et al. The Knowledge Engineering Review. Jan. 2017. vol. 32, e7, 1-30.*
First Office Action and English language translation, CN Application No. 201810699571.7, dated May 6, 2020, 14 pp.

* cited by examiner

COMMODITY RECOMMENDATION METHOD AND COMMODITY RECOMMENDATION DEVICE

RELATED APPLICATIONS

The present application is a 35 U.S.C. 371 national stage application of PCT International Application No. PCT/CN2019/079433, filed on Mar. 25, 2019, which claims the benefit of Chinese Patent Application No. 201810699571.7, filed on Jun. 29, 2018, the entire disclosure of which is incorporated herein by reference.

TECHNICAL FIELD

The present disclosure relates to the field of communication technologies, and in particular, to a commodity recommendation method and a commodity recommendation device.

BACKGROUND

Commodity recommendations can recommend appropriate commodities to a user in an appropriate scenario. Commonly, for example, an e-commerce recommendation system can recommend various commodities to users on the Internet, e.g. recommend new launched commodities, discounted commodities and hot-selling commodities. At present, there are various types of e-commerce recommendation systems on the Internet. However, with the development of new technologies such as cloud computing, big data, and the Internet of Things, the offline retail industry is also changing. Offline retailers need to rely on new technologies to develop new shopping modes. At present, there is a lack of a commodity recommendation method for users' offline shopping behaviors.

SUMMARY

It is an object of the present disclosure to provide a commodity recommendation method and a commodity recommendation device.

According to a first aspect of the present disclosure, there is provided a commodity recommendation device, comprising:

an information acquiring module configured to receive location information of a user to whom a commodity is to be recommended;

a commodity recommendation module configured to perform commodity recommendation according to the location information of the user to whom the commodity is to be recommended; and an information sending module configured to send recommended commodity information to the user to whom the commodity is to be recommended.

In the commodity recommendation device according to some embodiments of the present disclosure, the commodity recommendation module comprises:

a hotspot area acquiring module configured to acquire a hotspot area;

a location determining module configured to determine, according to the location information of the user to whom the commodity is to be recommended, whether the user to whom the commodity is to be recommended is in the hotspot area;

a commodity recommendation first sub-module configured to perform commodity recommendation based on historical shopping behaviors of a plurality of first sample users when the user to whom the commodity is to be recommended is not in the hotspot area; and a commodity recommendation second sub-module configured to perform commodity recommendation based on the historical shopping behaviors of the plurality of first sample users and sales volume of commodities in the hotspot area when the user to whom the commodity is to be recommended is in the hotspot area, wherein the plurality of first sample users comprises the user to whom the commodity is to be recommended.

In the commodity recommendation device according to some embodiments of the present disclosure, the hotspot area acquiring module comprises:

a location acquiring module configured to acquire location coordinates of a plurality of second sample users;

a clustering module configured to use a clustering algorithm to cluster the plurality of second sample users based on the location coordinates of the plurality of second sample users to obtain at least one second sample user class; and a hotspot area determining module configured to determine the hotspot area according to the at least one second sample user class, wherein a center point coordinate $(\bar{x}, \bar{y})$ and a radius $r$ of the hotspot area corresponding to each second sample user class are determined by the following formulas:

$$\bar{x}=(x_1+x_2+\ldots+x_n)/n,\ \bar{y}=(y_1+y_2+\ldots+y_n)/n,\ \text{and}$$

$$r = 2 \times \sqrt{\frac{\sum_{i=1}^{n}\{(x_i-\bar{x})^2+(y_i-\bar{y})^2\}}{n}},$$

where $n$ is a number of users in the second sample user class corresponding to the hotspot area, and $(x_i, y_i)$ is a location coordinate of the i-th user in the second sample user class corresponding to the hotspot area, and $i=1, \ldots, n$.

In the commodity recommendation device according to some embodiments of the present disclosure, the commodity recommendation first sub-module comprises:

a data acquiring module configured to acquire historical shopping behavior data of the plurality of first sample users;

a scoring matrix determining module configured to determine a first sample user-commodity scoring matrix according to the historical shopping behavior data;

a prediction scoring matrix determining module configured to determine a first sample user-commodity prediction scoring matrix by using a matrix decomposition-based collaborative filtering algorithm according to the first sample user-commodity scoring matrix; and a commodity recommendation third sub-module configured to perform commodity recommendation to the user to whom the commodity is to be recommended according to the first sample user-commodity prediction scoring matrix.

According to a second aspect of the present disclosure, there is provided a commodity recommendation system comprising a commodity recommendation device and a user terminal communicatively coupled to the commodity recommendation device, wherein:

the user terminal is configured to send location information of a user to whom a commodity is to be recommended to the commodity recommendation device;

the commodity recommendation device is configured to receive the location information of the user to whom the commodity is to be recommended, perform commodity recommendation according to the location information of the user to whom the commodity is to be recommended, and send recommended commodity information to the user to whom the commodity is to be recommended; and the user terminal is further configured to receive and display the recommended commodity information from the commodity recommendation device.

According to a third aspect of the present disclosure, there is provided a commodity recommendation method, comprising:

receiving location information of a user to whom a commodity is to be recommended;

performing commodity recommendation according to the location information of the user to whom the commodity is to be recommended; and sending recommended commodity information to the user to whom the commodity is to be recommended.

In the commodity recommendation method according to some embodiments of the present disclosure, the step of performing commodity recommendation according to the location information of the user to whom the commodity is to be recommended comprises:

acquiring a hotspot area;

determining, according to the location information of the user to whom the commodity is to be recommended, whether the user to whom the commodity is to be recommended is in the hotspot area;

performing commodity recommendation based on historical shopping behaviors of a plurality of first sample users when the user to whom the commodity is to be recommended is not in the hotspot area wherein the plurality of first sample users comprises the user to whom the commodity is to be recommended; and performing commodity recommendation based on the historical shopping behaviors of the plurality of first sample users and sales volume of commodities in the hotspot area when the user to whom the commodity is to be recommended is in the hotspot area.

In the commodity recommendation method according to some embodiments of the present disclosure, the step of acquiring a hotspot area comprises:

acquiring location coordinates of a plurality of second sample users;

using a clustering algorithm to cluster the plurality of second sample users based on the location coordinates of the plurality of second sample users to obtain at least one second sample user class; and determining the hotspot area according to the at least one second sample user class, wherein a center point coordinate $(\bar{x}, \bar{y})$ and a radius r of the hotspot area corresponding to each second sample user class are determined by the following formulas:

$$\bar{x}=(x_1+x_2+ \ldots +x_n)/n, \bar{y}=(y_1+y_2+ \ldots +y_n)/n, \text{ and}$$

$$r = 2 \times \sqrt{\frac{\sum_{i=1}^{n}\{(x_i - \bar{x})^2 + (y_i - \bar{y})^2\}}{n}},$$

where n is a number of users in the second sample user class corresponding to the hotspot area, and $(x_i, y_i)$ is a location coordinate of the i-th user in the second sample user class corresponding to the hotspot area, and $i=1, \ldots, n$.

In the commodity recommendation method according to some embodiments of the present disclosure, the clustering algorithm comprises an OPTICS algorithm or a DBSCAN algorithm.

In the commodity recommendation method according to some embodiments of the present disclosure, the step of performing commodity recommendation based on historical shopping behaviors of a plurality of first sample users comprises:

acquiring historical shopping behavior data of the plurality of first sample users;

determining a first sample user-commodity scoring matrix according to the historical shopping behavior data;

determining a first sample user-commodity prediction scoring matrix by using a matrix decomposition-based collaborative filtering algorithm according to the first sample user-commodity scoring matrix; and performing commodity recommendation to the user to whom the commodity is to be recommended according to the first sample user-commodity prediction scoring matrix.

In the commodity recommendation method according to some embodiments of the present disclosure, the plurality of first sample users are m first sample users U1, ..., Um, the historical shopping behaviors of the plurality of first sample users involve n commodities V1, ..., Vn, and the step of determining a first sample user-commodity scoring matrix according to the historical shopping behavior data comprises:

determining scores of each of the first sample users Ui for the commodities V1, ..., Vn according to the historical shopping behavior data, wherein a score of Ui for Vj is null in case that the historical shopping behavior of the first sample user Ui does not involve the commodity Vj, where $i=1, \ldots, m$, $j=1, \ldots, n$; and determining a first sample user-commodity scoring matrix $A_{m \times n}$ according to the score of each of the first sample users Ui for the commodities V1, ..., Vn, wherein an element A(i,j) of the matrix A represents the score of the user Ui for the commodity Vj.

In the commodity recommendation method according to some embodiments of the present disclosure, the step of determining a first sample user-commodity prediction scoring matrix by using a matrix decomposition-based collaborative filtering algorithm according to the first sample user-commodity scoring matrix comprises:

acquiring matrices $U_{m \times k}$ and $V_{n \times k}$ by using the matrix decomposition-based collaborative filtering algorithm, such that $A \approx U \times V^T$, $k \ll m, n$; and determining the first sample user-commodity prediction scoring matrix A' by the following formula:

$$A'=U \times V^T,$$

wherein an element A'(i,j) of the matrix A' represents a predicted score of the user Ui for the commodity Vj.

In the commodity recommendation method according to some embodiments of the present disclosure, the step of performing commodity recommendation to the user to whom the commodity is to be recommended according to the first sample user-commodity prediction scoring matrix comprises:

performing commodity recommendation to the user to whom the commodity is to be recommended according to the scores of the user to whom the commodity is to be recommended in the first sample user-commodity prediction scoring matrix A' for the commodities U1, ..., Um.

In the commodity recommendation method according to some embodiments of the present disclosure, the step of determining according to the location information of the user to whom the commodity is to be recommended, whether the user to whom the commodity is to be recommended is in the hotspot area comprises:

calculating an Euclidean distance between the location of the user to whom the commodity is to be recommended and a center point of the hotspot area; and comparing the calculated distance to a radius of the hotspot area: if the distance is greater than the radius, the user being not in the hotspot area; otherwise, the user being in the hotspot area.

In the commodity recommendation method according to some embodiments of the present disclosure, the step of performing commodity recommendation based on the historical shopping behaviors of the plurality of first sample users and sales volume of commodities in the hotspot area when the user to whom the commodity is to be recommended is in the hotspot area comprises:

ranking commodities in the hotspot area according to the sales volume from high to low, to obtain top ranked N commodities, wherein N is an integer greater than or equal to 1;

acquiring historical shopping behavior data of the plurality of first sample users;

determining the first sample user-commodity scoring matrix according to the historical shopping behavior data;

determining, by using the matrix decomposition-based collaborative filtering algorithm, a first sample user-commodity prediction scoring matrix for the first sample user-commodity scoring matrix; and performing commodity recommendation according to the first sample user-commodity prediction scoring matrix and the top ranked N commodities in the hotspot area.

In the commodity recommendation method according to some embodiments of the present disclosure, the step of performing commodity recommendation according to the first sample user-commodity prediction scoring matrix and the top ranked N commodities in the hotspot area comprises:

acquiring at least one first recommended commodity according to the first sample user-commodity prediction scoring matrix, and acquiring at least one second recommended commodity according to the top ranked N commodities in the hotspot area; and recommending the first and second recommended commodities to the user to whom the commodity is to be recommended in a fixed or random priority order.

In the commodity recommendation method according to some embodiments of the present disclosure, the matrix decomposition-based collaborative filtering algorithm comprises an alternative least squares matrix decomposition-based collaborative filtering algorithm or a gradient descent matrix decomposition-based collaborative filtering algorithm.

In the commodity recommendation method according to some embodiments of the present disclosure, the commodity recommendation method further comprising: after performing commodity recommendation according to the location information of the user to whom the commodity is to be recommended and before sending the recommended commodity information to the user to whom the commodity is to be recommended, acquiring commodity information that the user to whom the commodity is to be recommended has placed in a shopping cart; and deleting the commodity that has been placed in the shopping cart from the recommended commodity information when the recommended commodity information comprises the commodity that has been placed in the shopping cart.

In the commodity recommendation method according to some embodiments of the present disclosure, the step of acquiring commodity information that the user to whom the commodity is to be recommended has placed in a shopping cart comprises: acquiring the commodity information of the commodity that has been placed in the shopping cart by using a commodity identification device on the shopping cart.

According to a fourth aspect of the present disclosure, there is provided a computing device comprising: a processor; and a memory having computer readable instructions stored thereon that, when executed by the processor, causes the computing device to perform the commodity recommendation method according to some embodiments of the present disclosure.

According to a fifth aspect of the present disclosure, there is provided a computer readable storage medium comprising computer readable instructions stored thereon that, when executed, implement the commodity recommendation method according to some embodiments of the present disclosure.

DETAILED DESCRIPTION OF EMBODIMENTS

The technical problems to be solved, the technical solutions, and the advantages of the present disclosure will be more clearly described in detail below in conjunction with the accompanying drawings and specific embodiments.

Figure 1:
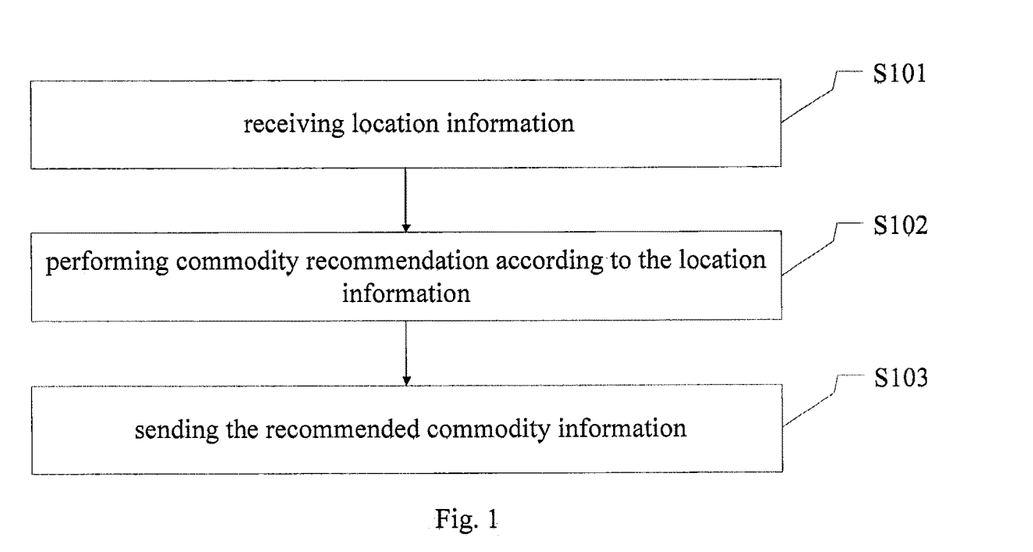
FIG. 1 illustrates a flow chart of a commodity recommendation method in accordance with some embodiments of the present disclosure.

FIG. 1 illustrates a flow chart of a commodity recommendation method in accordance with some embodiments of the present disclosure. In an offline store or supermarket, a commodity recommendation device may be provided for performing the commodity recommendation method shown in FIG. 1. The commodity recommendation device may be any computing device having data transceiving and processing capabilities, such as a server, a computer, or the like. As shown in FIG. 1, a commodity recommendation method according to some embodiments of the present disclosure comprises the following steps S101-S103.

S101, receiving location information of a user to whom a commodity is to be recommended.

The location information may be a location coordinate of the user when shopping in a mall or supermarket, and the location coordinate may be represented by, for example, coordinate points in a plane (two-dimensional) or spatial (three-dimensional) rectangular coordinate system. For example, when there is only one floor in the mall, a plane coordinate system may be used, and when the mall is large and contains multiple layers, a space coordinate system is needed to uniquely represent each location in the mall. Of course, in the present disclosure, the location coordinates may also adopt other representations, such as polar coordinates and the like. Hereinafter, a mall comprising only one floor will be described as an example.

The user can locate himself by using a location function (such as a GPS module) integrated in a user terminal (such as a mobile phone or an electronic device installed on a shopping cart), and send the location information to the commodity recommendation device in the mall or supermarket through the terminal. Since a distance between the user terminal and the user is very close, the location information of the user terminal can be regarded as the location information of the user. The user terminal can send the location information to the server every preset time.

In some embodiments, in step S101, it may further comprise receiving identity information or login information of the user. The identity information or login information comprises a user ID that uniquely identifies the user. Of course, the login information may further comprise at least one of a variety of user basic information, such as user photo, name, birthday, age, gender, occupation, cumulative number of shopping, and the like. The manner in which the commodity recommendation device receives the user login information may comprise: firstly, the user terminal acquires the login information by: receiving the user ID manually input by the user, scanning a two-dimensional code, scanning a chip card, and using the built-in camera to perform facial recognition on the user, etc.; subsequently, the user terminal sends the acquired login information to the commodity recommendation device through a wired or wireless network.

In some embodiments, a user record or member information corresponding to the user identity information or the user ID is stored in the commodity recommendation device or other servers in the mall. Generally, when shopping in the mall for the first time, the user can register as a member and enter membership information. After registration, the user may get a membership card. Since each membership card corresponds to a unique card number, the card number of the membership card can be used as the user ID. Then, the user ID may be entered into the server, or the user's registration information may be directly entered into the server and the user ID is generated by the server, and returned to the user for use by the user when shopping in the mall. The user ID can be expressed, for example, by a one-dimensional code, a two-dimensional code, or a card number. The member information in the member database may be information entered at the time of initial registration of the user, or may be information obtained by recording and analyzing user-related data (for example, sales data). The member information may comprise personal information of the user, such as birthday, age, gender, ethnicity, occupation, and the like. The member information may also comprise user history shopping behaviors such as purchased commodities, the number of purchases, purchase preferences, and the like.

S102, performing commodity recommendation according to the location information of the user to whom the commodity is to be recommended.

After receiving the user location information, the commodity recommendation device may recommend a commodity near the location, such as a promotional commodity or a bestseller, to the user according to the location of the user. In addition, it is also possible to recommend a commodity near the location according to the user's historical shopping record.

In some embodiments, commodity recommendation may be performed in different ways according to different locations of the user. For example, a linear shopping place (such as a mall or a supermarket) can be divided into different areas, and then the user's desired commodities are recommended to the user according to the commodity characteristics of the different areas in which the user is located. For example, as described in detail below, the mall may be divided into a hotspot area (i.e., a hot-sale area or a crowded area) and a non-hotspot area, and then according to whether the user is in the hotspot area, different algorithms are used for commodity recommendation, that is, in the non-hotpot area a collaborative filtering algorithm can be adopted, while in the hotspot area a collaborative filtering algorithm may be used in conjunction with the commodity sales topN algorithm.

This location-based recommendation method is better suited to the needs of user, further improving the accuracy of commodity recommendation and the convenience of shopping.

S103, sending recommended commodity information to the user to whom the commodity is to be recommended.

After the commodity recommendation is completed, the recommended commodity information may be sent to the user terminal through a wired or wireless network (e.g., WIFI), thereby informing the user of relevant information of the recommended commodity, such as the commodity name, the specific location in the mall, for the user's reference.

Figure 2:
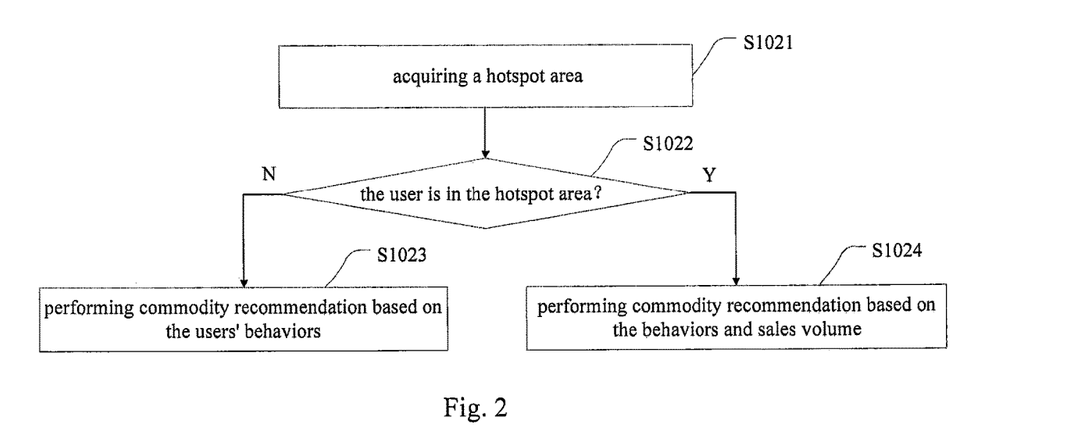
FIG. 2 illustrates a flow chart of performing commodity recommendation according to location information in a commodity recommendation method in accordance with some embodiments of the present disclosure.

FIG. 2 illustrates a flow chart of performing commodity recommendation according to location information in a commodity recommendation method in accordance with some embodiments of the present disclosure. As shown in FIG. 2, the step S102 shown in FIG. 1, i.e. the step of performing commodity recommendation according to the location information of the user to whom the commodity is to be recommended, may comprise the following steps S1021-1024.

S1021, determining a hotspot area.

In some embodiments, the shopping area of the mall or supermarket may be divided or classified into a number of different areas in advance, and then different commodity recommendation methods may be employed according to different areas in which the user is located. For example, the hotspot area described in step S1021 may represent a crowded area in the mall or an area where shoppers stay for a long time, and may be a predetermined area. For example, the hotspot area may be directly preset according to the layout of commodities in the mall, or may be set by the user's location information or motion trajectory data for a period of time. For example, the hotspot area can be determined by clustering users whose location changes are small within a certain time according to their location coordinates, that is, the area where such users are located is the hotspot area, as described in detail in conjunction with FIG. 3 below.

S1022, determining, according to the location information of the user to whom the commodity is to be recommended, whether the user to whom the commodity is to be recommended is in the hotspot area.

S1023, performing commodity recommendation based on historical shopping behaviors of a plurality of first sample users when the user to whom the commodity is to be recommended is not in the hotspot area, wherein the plurality of first sample users comprises the user to whom the commodity is to be recommended.

The purpose of step S1023 is to predict the shopping behavior of the current user according to the shopping behaviors of the target user or the user to whom the commodity is to be recommended and other users in the mall, thereby recommending the commodity to the target user. The recommendation method is based on the following idea: the purchasing situation of commodities for different users has certain similarities, so the recommendation in combination with the purchasing habits of all users has a certain reference value.

The first sample users may comprise all users registered as members in the mall. Optionally, the first sample users may also comprise only a part of the member users, and exclude those member users who have no shopping records or fewer shopping records, so as to simplify the calculation amount and improve the accuracy of the recommendation. The first sample users may be updated regularly to keep up with the times and more in line with the actual situations of the user's shopping behaviors.

A user's shopping behavior refers to behaviors or actions related to the purchase of a commodity when the user is shopping in a mall or supermarket, such as browsing the commodity, viewing the commodity, putting the commodity into the shopping cart, and the like. In general, the user's shopping behavior can be broadly divided into four categories: not viewing commodity, only viewing commodity, viewing commodity and putting it into a shopping cart but ultimately not purchasing, and purchasing. The above division method is only used as an example, and other methods may be used to identify the user's shopping behavior in practical applications.

In some embodiments, the above shopping behavior may be identified or converted into a number, which may be regarded as a score of the user for the corresponding commodity, and thus scores of a plurality of first sample users U1-Um for a plurality of commodities V1-Vn may be obtained. For each sample user (comprising the user to whom the commodity is to be recommended or the target user), according to the above scores, the matrix decomposition-based collaborative filtering algorithm can be used to predict scores of the user for unscored (i.e., the user's shopping behavior is "null") commodities, which in turn recommends the commodity with a high predicted score to the user. For a specific manner of commodity prediction by using the matrix decomposition-based collaborative filtering algorithm, please refer to the description below in conjunction with FIG. 4.

S1024, performing commodity recommendation based on the historical shopping behaviors of the plurality of first sample users and sales volume of commodities in the hotspot area when the user location is in the hotspot area.

In an embodiment, when the user to whom the commodity is to be recommended is in the hotspot area, commodities may be recommended to the user based on the sales volume of the commodities in the hotspot area combined with the historical shopping behaviors of the plurality of first sample users in the step S1023. On the one hand, in the real world, because most users have similar preferences, the purchased commodities have similarities, the commodities with larger sales may largely indicate that they are needed by most users, and such commodities may have different advantages from other commodities, such as high quality and low price, new commodity promotion, exclusive sales, etc., it is feasible to perform commodity recommendation according to the sales volume. When the user is located in the hotspot area, recommending the commodities that are also in the hotspot area to the user is convenient for the user to pick up commodities, which may effectively prevent the user from going too far to pick up the commodities and further facilitate the user's shopping needs. On the other hand, since the hotspot area is only a partial area with respect to the entire mall and the commodities in the hotspot area are limited, simply recommending based on the sales volume of the commodities in the hotspot area may be one-sided and cannot fully meet the user's needs. Therefore, when the user to whom the commodity is to be recommended is located in the hotspot area, commodity recommendation may be performed in a recommendation method in which the historical shopping behaviors based on the plurality of first sample users (comprising the user to whom the commodity is to be recommended) in step S1023 (i.e., scores or shopping behaviors of all or some users for all the commodities in the mall) may be combined on the basis of considering the hot-sale commodities in the area, in order to more accurately recommend to the user the commodities that they need and like.

Figure 3:
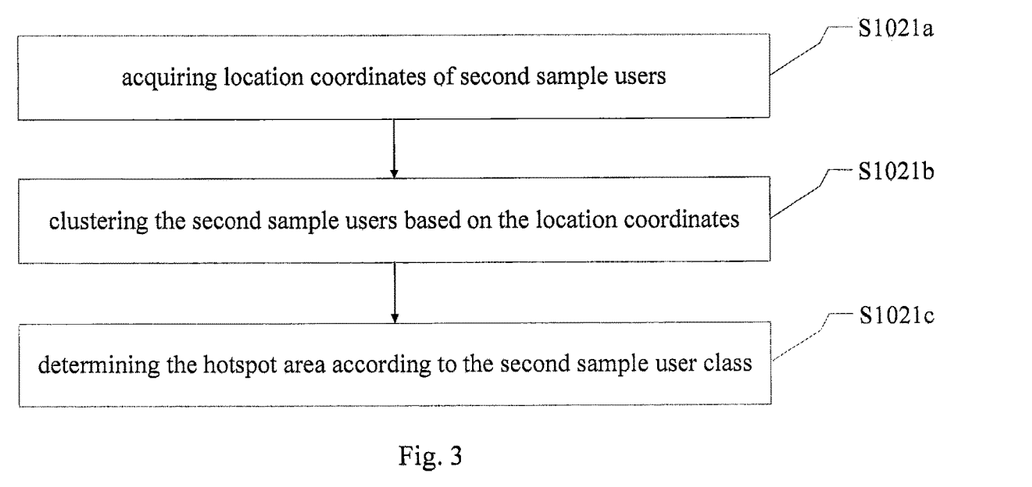
FIG. 3 illustrates a flow chart of acquiring a hotspot area in a commodity recommendation method in accordance with some embodiments of the present disclosure.

FIG. 3 illustrates a flow chart of acquiring a hotspot area in a commodity recommendation method in accordance with some embodiments of the present disclosure. As mentioned above, the hotspot area represents a crowded area in a mall or an area where shoppers stay longer. Therefore, in addition to predetermining the hotspot area according to the commodity layout or the historical shopping information as described above, the hotspot area may also be determined according to the locations of all the customers or consumers currently shopping in the mall, such as a customer-intensive area, that is, an area where the location points are concentrated may be defined as the hotspot area. Thus, customers whose location points are concentrated within a certain area can be classified into one category, and the area in which such customers are located can be determined as the hotspot area. Therefore, the location coordinates of all users in the current mall can be used as sample points, and the sample points (or corresponding users) are clustered by a clustering algorithm to obtain one or more classes of users (or their location points) (i.e., a collection of users whose location points are close to each other). The area in which the users of the one or more classes are located is just a hotspot area.

As shown in FIG. 3, the step S1021 of acquiring a hotspot area shown in FIG. 2 comprises the following steps S1021a-S1021c.

S1021a, acquiring location coordinates of a plurality of second sample users.

The second sample users may refer to all customers currently in the shopping area of the mall. The shopping area is an area of the mall where the mall entrance, exit, and elevator area are removed. Optionally, the second sample users may also be a part of the customers who are shopping in the mall. For example, the second sample users may be defined as users whose location change is small within a certain period of time (i.e., customers who stay long within a certain area). In this way, the area where they stay is closer to the hotspot area. For example, the second sample users can be determined according to the trajectories of the customers.

Similar to the step S101 shown in FIG. 1, the second sample user can also locate himself through a location function integrated in a user terminal (such as a mobile phone or an electronic device installed on a shopping cart), and send the location information to the commodity recommendation device in the mall or supermarket through the terminal. The location information may be location coordinates of the user when shopping in the mall or supermarket, and the location coordinates may be represented, for example, by coordinates (x, y) in a plane rectangular coordinate system.

S1021b, using a clustering algorithm to cluster the plurality of second sample users by taking the location coordinates of the plurality of second sample users as sample points, so as to obtain on or more classes of the second sample users.

In some embodiments, the second sample users may be clustered by using the clauster algorithm of Ordering Points To Identify the Clustering Structure (OPTICS), in order to obtain one or more classes of the second sample users. The OPTICS clustering algorithm is a density-based clustering algorithm, the goal of which is to cluster the data in space according to the density distribution. In this way, an area where each user class obtained by clustering based on the density of the location coordinate points is located can be regarded as a hotspot area, so that the obtained hotspot area can effectively reflect the frequency of the user appearing in the hotspot area. The higher the frequency that the user appears is, the more likely the user is to purchase in the hotspot area. Recommending the commodity in the hotspot area to the user can improve the accuracy of the commodity recommendation. Optionally, the foregoing step S1021b may also adopt other clustering algorithms, such as Density-Based Spatial Clustering of Applications with Noise (DBSCAN). In some embodiments, the specific process of clustering the second sample users by using a clustering algorithm is as follows:

inputting: a data sample D, wherein the data sample D includes coordinate points of the second sample users;

initializing: reachable distances and core distances of all coordinate points as MAX, a neighborhood radius as ε, and the minimum number of points within the ε neighborhood of a given point when the given point being a core object as MinPts, where MAX, ε and MinPts can be set according to the actual situation;

Step 1, establishing two queues, which are an ordered queue (to-be-processed data) and a result queue (processed data) respectively, where the ordered queue is used to store core objects and directly reachable objects of the core objects, which are ranked in ascending order of reachable distances; and the result queue is used to store an output order of the sample points;

Step 2, ending the algorithm if all the sample point data in the sample D is processed; otherwise, selecting an point that is unprocessed and that is a core object from D, putting the core point into the result queue, putting direct density reachable points of the core point into the ordered queue, and ranking them in ascending order of reachable distances;

Step 3, returning to step 2 if the ordered queue is null, otherwise taking the first point from the ordered queue;

3.1 determining whether the point is a core point: if not, returning to step 3; if yes, storing the point into the result queue, if the point is not in the result queue;

3.2 if the point is the core point, finding all its direct density reachable points, and putting these points into the ordered queue, and reordering the points in the ordered queue according to the reachable distances; If a direct density reachable point is already in the ordered queue and a new reachable distance is less than the old reachable distance, replacing the old reachable distance by the new reachable distance;

3.3 repeating step 3 until the ordered queue is null;

Step 4, taking out the points in order from the result queue: if the reachable distance of the point is not greater than a given radius ε, the point belonging to the current class; otherwise proceeding to step 5;

Step 5, if the core distance of the point is greater than a given radius ε, the point being noise and can be ignored; otherwise the point belonging to a new class and skipping to step 1;

Step 6, completing the traversal of the result queue and ending the algorithm.

S1021c, determining the hotspot area according to the one or more second sample user classes, where a center point ($\bar{x}, \bar{y}$) and a radius r of the hotspot area corresponding to each second sample user class are determined by the following formulas:

$$\bar{x}=(x_1+x_2+\ldots+x_n)/n, \bar{y}=(y_1+y_2+\ldots+y_n)/n, \quad (1) \text{ and}$$

$$r = 2 \times \sqrt{\frac{\sum_{i=1}^{n}\{(x_i-\bar{x})^2+(y_i-\bar{y})^2\}}{n}}, \quad (2)$$

where n is a number of users in the second sample user class corresponding to the hotspot area, and ($x_i, y_i$) is a location coordinate of the i-th user in the second sample user class corresponding to the hotspot area, and i=1, . . . , n.

As shown in the above formulas (1) and (2) in the step S1021c, the obtained hotspot area may be a circular area. Therefore, determining whether the user to whom the commodity is to be recommended is in the hotspot area can be realized by calculating an Euclidean distance d between the location of the user to whom the commodity is to be recommended and the center point ($\bar{x}, \bar{y}$) of the hotspot area and comparing it to the radius r of the hotspot area: if d>r, the user is not in the hotspot area; and if d<r, the user is in the hotspot area. Optionally, in addition to the circular hotspot area described above, different shapes of hotspot areas may be defined by other means.

Figure 4:
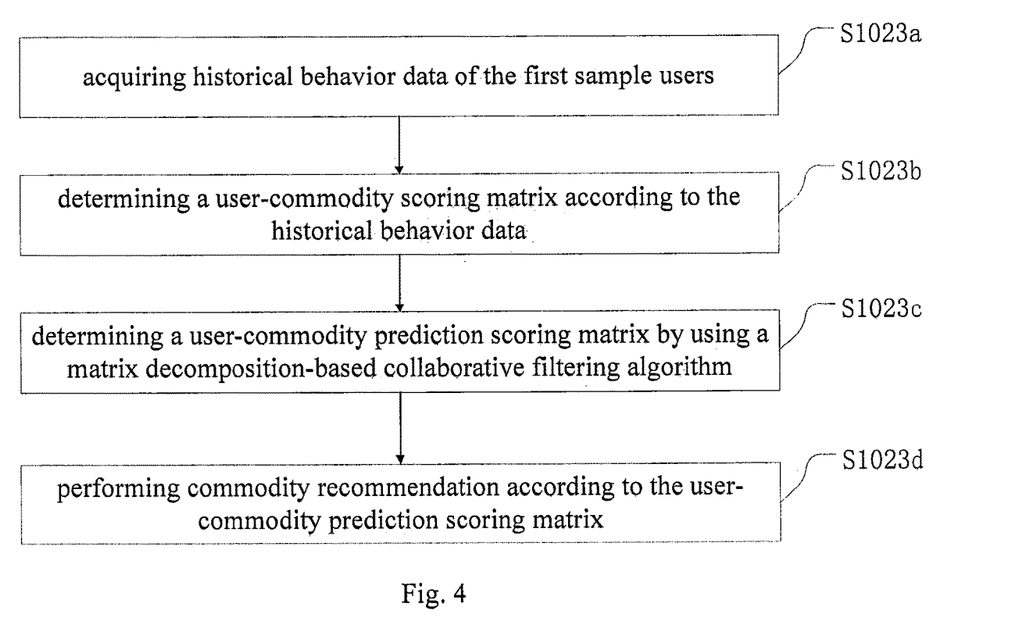
FIG. 4 illustrates a flow chart of performing commodity recommendation based on historical shopping behaviors of a plurality of first sample users in a commodity recommendation method in accordance with some embodiments of the present disclosure.

FIG. 4 illustrates a flow chart of performing commodity recommendation based on historical shopping behaviors of first sample users in a commodity recommendation method in accordance with some embodiments of the present disclosure. As shown in FIG. 4, step S1023 shown in FIG. 2 further comprises the following steps S1023a-S1023d.

S1023a, acquiring historical shopping behavior data of the plurality of first sample users.

As described above, in some embodiments, the historical shopping behavior data of the first sample user can be set as follows:

when the first sample user does not view the commodity, the first sample user identifies the shopping behavior data of the commodity as a null value;

when the first sample user only views the commodity, the first sample user identifies the shopping behavior data of the commodity as "viewing";

when the first sample user views the commodity, puts the commodity into the shopping cart but ultimately does not purchase, the first sample user identifies the shopping behavior data of the commodity as "putting into the shopping cart"; and when the first sample user purchases the commodity, the first sample user identifies the shopping behavior data of the commodity as "purchasing".

S1023b, determining a first sample user-commodity scoring matrix according to the historical shopping behavior data.

For the purpose of convenience for processing, the above historical shopping behavior data can be converted to a numerical representation and these numbers can be viewed as the scores of the user for the corresponding commodity. In some embodiments, the correspondence between the historical shopping behavior of the first sample user and his scores for the commodity may be determined according to Table 1. Optionally, the relationship between the shopping behavior and the commodity scoring can also be defined in other ways.

TABLE 1

Correspondence table between shopping behavior and commodity scoring

| User's shopping behavior data | Scores of the user for the commodity |
|---|---|
| Not viewing (and not purchasing) | Null |
| Viewing (but not putting into the shopping cart and not purchasing) | 1 |
| Putting into the shopping cart (but not purchasing) | 2 |
| Purchasing | 3 |

In this way, a scoring table of a plurality of first sample users U1-U5 for a plurality of commodities V1-V4 as shown in Table 2 can be obtained. Table 2 is an exemplary first sample user-commodity scoring table. The U1-U5 respectively represent different first sample users, the V1-V4 respectively represent different commodities, and the values in the table are scores of first sample user for the corresponding commodities, where "–" indicates a null value.

TABLE 2

First Sample User - Commodity Scoring table

| User | Commodity | | | |
|---|---|---|---|---|
| | V1 | V2 | V3 | V4 |
| U1 | 3 | 2 | 3 | — |
| U2 | 1 | 3 | — | 1 |
| U3 | 2 | 3 | 1 | 1 |
| U4 | 3 | — | 2 | 1 |
| U5 | 3 | 2 | 1 | — |

For the convenience of calculation, the above scoring table can be converted into a form of a scoring matrix. Therefore, for the m first sample users U1, . . . , Um and n commodities V1, . . . , Vn, according to the historical shopping behavior data of the first sample user, a m×n first sample user-commodity scoring matrix A can be obtained by the scoring strategy shown in Table 1 above. An element A(i,j) in the matrix A represents the score of the user Ui for the commodity Vj, which may represent the degree of interest of the user Ui for the commodity Vj. A higher score indicates that the user Ui, is more interested in the commodity Vj. If the score is "null value" or default (represented by "–"), it means that the shopping behavior of the user Ui for the commodity Vj is "not viewing", that is, there is no historical shopping behavior about Vj in the historical shopping behavior record of the first sample user Ui (so it is not possible to score). Therefore, these missing values in the matrix A are predicted scores of the user Ui for the commodity Vj that we want to determine. The process of predicting the score is a process to complete the null values of the matrix A.

S1023c, determining a first sample user-commodity prediction scoring matrix by using a matrix decomposition-based collaborative filtering algorithm according to the first sample user-commodity scoring matrix.

In the present disclosure, a matrix with no missing values obtained by determining predicted scores at all missing elements through completing the null values or missing values of the first sample user-commodity scoring matrix $A_{m \times n}$, may be referred to as a first sample user-commodity prediction scoring matrix A'. In order to obtain the first sample user-commodity prediction scoring matrix A', an alternative least squares (ALS) matrix decomposition-based collaborative filtering algorithm may be employed.

In general, in the ALS matrix decomposition-based collaborative filtering algorithm, since the scoring matrix A containing missing values is usually low rank, the m×n scoring matrix A can be approximated by the product of two small matrices $U_{m \times k}$ and $V_{n \times k}$: $A \approx U \times V^T$, k<<m, n. According to the ALS matrix decomposition-based collaborative filtering algorithm, the matrices U and V can be obtained, so that the product of U and V can be used to restore the user-commodity scoring matrix, that is, the missing values originally existing in the matrix are predicted, to obtain the first sample user-commodity prediction scoring matrix $A' = U \times V^T$. For the ALS matrix decomposition-based collaborative filtering algorithm, the computational engine Spark can be used for model training and optimization.

Optionally, a gradient descent matrix decomposition-based collaborative filtering algorithm may also be used to determine the first sample user-commodity prediction scoring matrix.

S1023d, performing commodity recommendation to the user to whom the commodity is to be recommended according to the first sample user-commodity prediction scoring matrix.

After determining the first sample user-commodity prediction scoring matrix, scores of all first sample users for all the commodities in the mall can be determined. Since the first sample users comprise the user to whom the commodity is to be recommended, the predicted scores of the user to whom the commodity is to be recommended for all the commodities in the mall can be obtained from the prediction scoring matrix. Therefore, it is possible to recommend commodity to the user according to the level of the predicted scores. For example, the predicted scores of the user for each commodity are ranked in descending order, and the top ranked M commodities are selected, where M is a positive integer.

In this embodiment, since the predicted scores reflect the degree of interest of the user to the corresponding commodity, the recommended commodity is determined according to the predicted scores of the user for various commodities, so that the recommended solution more accurately matches the user's needs and desires, which enhances the personalized experience.

Figure 5:
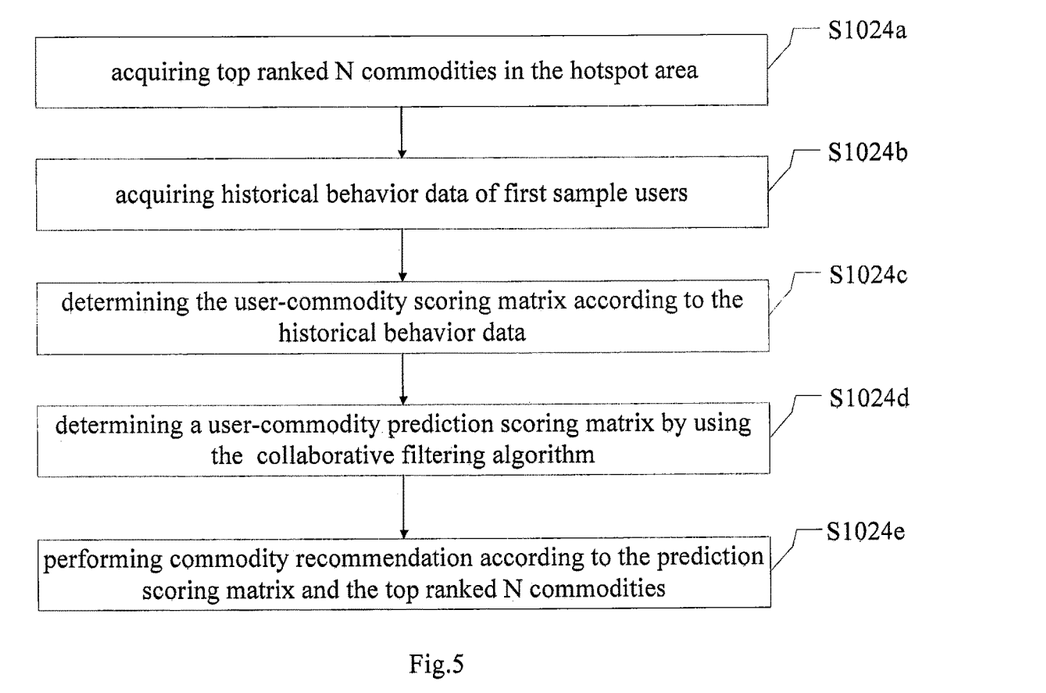
FIG. 5 illustrates a flow chart of performing commodity recommendation based on the historical shopping behaviors of the plurality of first sample users and sales volume of commodities in the hotspot area in a commodity recommendation method in accordance with some embodiments of the present disclosure.

FIG. 5 illustrates a flow chart of performing commodity recommendation based on the historical shopping behaviors of the plurality of first sample users and sales volume of commodities in the hotspot area in a commodity recommendation method according to some embodiments of the present disclosure. As shown in FIG. 5, the step S1024 in FIG. 3 comprises the following steps:

S1024a, ranking commodities in the hotspot area according to the sales volume from high to low, to obtain top ranked N commodities, wherein N is an integer greater than or equal to 1;

S1024b, acquiring historical shopping behavior data of first sample users;

S1024c, determining the first sample user-commodity scoring matrix according to the historical shopping behavior data;

S1024d, determining, by using the matrix decomposition-based collaborative filtering algorithm, a first sample user-commodity prediction scoring matrix based on the first sample user-commodity scoring matrix; and S1024e, performing commodity recommendation according to the first sample user-commodity prediction scoring matrix and the top ranked N commodities in the hotspot area.

In this embodiment, when the user is in the hotspot area, the recommended commodities are determined by a combination of two ways. The first way is: the commodity recommendation according to the sales volume of the commodities in the hotspot area (i.e., the TopN algorithm); the second way is: the commodity recommendation according to the historical shopping behaviors of the first sample users (for example, all the users or members in the mall who have the shopping behavior records), which is the same as the way when the user is not in the hotspot area (see the flow chart shown in FIG. 4). The combined ways described above take into account not only the characteristics of the user (the historical shopping habits of himself and other users), but also the characteristics of the commodity (the sales volume and location of the commodity), which is better suited to the needs of user, thereby further improving the accuracy of commodity recommendation and the convenience of shopping.

Regarding how the two different recommendation ways are used in combination, the following measures can be taken. For example, the collaborative filtering algorithm and the topN algorithm may be separately used to acquire a number of recommended commodities, and then the acquired different recommended commodities may be recommended to the user in different priorities. These recommended commodities are fixed or randomly placed in different recommended positions (i.e., setting recommendation priorities) for user's self-selection. Regarding how to set different algorithms to get the recommended positions of different recommended commodities, at first the recommended commodities may be set randomly or fixedly, and then be dynamically adjusted according to the specific conditions of the user's selection (click). For example, if the recommended commodity obtained by the topN algorithm has a high click rate, such commodity is placed in the top recommended position for being preferentially recommended; otherwise, the recommended commodity obtained by the collaborative filtering algorithm is preferentially recommended.

Specifically, in some embodiments, the step S1024e shown in FIG. 5, i.e. the step of performing commodity recommendation according to the first sample user-commodity prediction scoring matrix and the top ranked N commodities in the hotspot area may comprise:

firstly, acquiring at least one first recommended commodity according to the first sample user-commodity prediction scoring matrix, and acquiring at least one second recommended commodity according to the top ranked N commodities in the hotspot area; and secondly, recommending the first and second recommended commodities to the user to whom the commodity is to be recommended in a fixed or random priority order.

Figure 6:
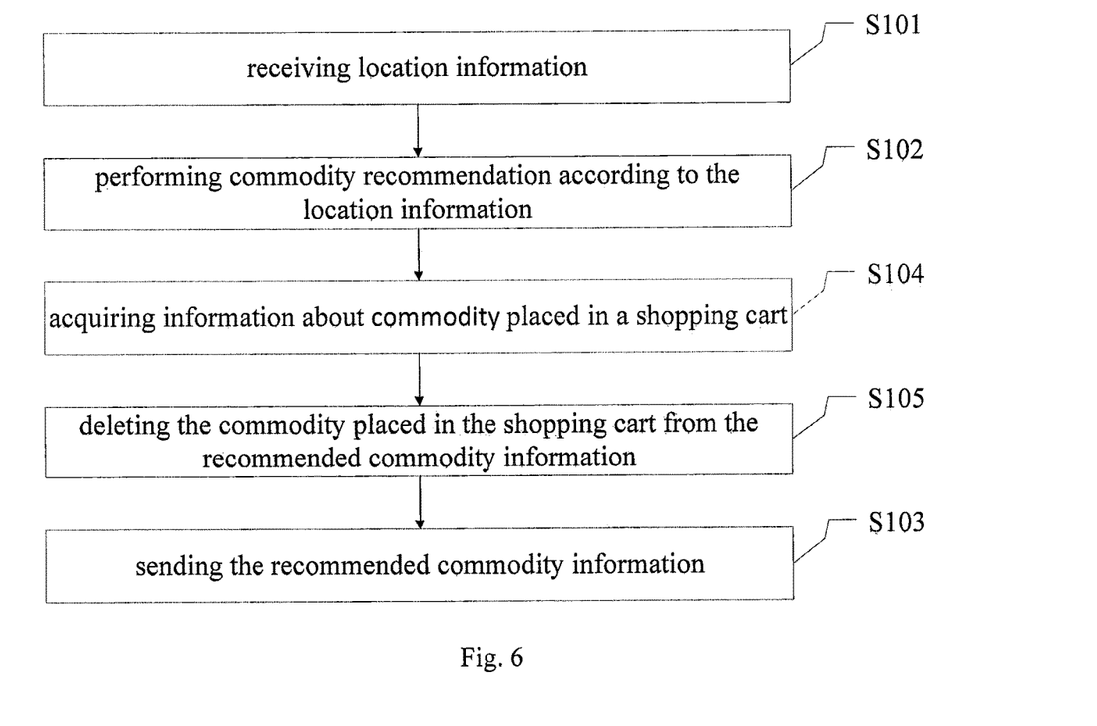
FIG. 6 illustrates a flow chart of a commodity recommendation method in accordance with further embodiments of the present disclosure.

FIG. 6 illustrates a flow chart of a commodity recommendation method in accordance with further embodiments of the present disclosure. Compared with FIG. 1, the commodity recommendation method described in FIG. 6 further comprises the following steps S104-S105 after step S102 and before step S103.

S104, acquiring information about a commodity that the user to whom the commodity is to be recommended has placed in a shopping cart.

For example, a camera or a scanning device is provided on the shopping cart. When the user puts the commodity into the shopping cart, the camera or the scanning device on the shopping cart acquires the commodity information of the commodity, and the commodity information may comprise the commodity ID, and may also comprise the commodity name, the commodity type, the commodity price, and the like. The commodity information acquired by the shopping cart may be further sent to the commodity recommendation device.

S105, deleting the commodity that has been placed in the shopping cart from the recommended commodity information when the recommended commodity information comprises the commodity that has been placed in the shopping cart.

After the server determines the recommended commodities, it is possible to inquire in the recommended commodities according to the acquired information about the commodity placed in a shopping cart. If the recommended commodity information comprises the commodity corresponding to the acquired information (hereinafter referred to as B commodity), the user has already put the B commodity in the recommended commodity into the shopping cart at this time. In order to prevent the user from repeatedly purchasing the B commodity with reference to the recommended commodity, the B commodity comprised in the recommended commodity information may be deleted to obtain new recommended commodity information.

Figure 7:
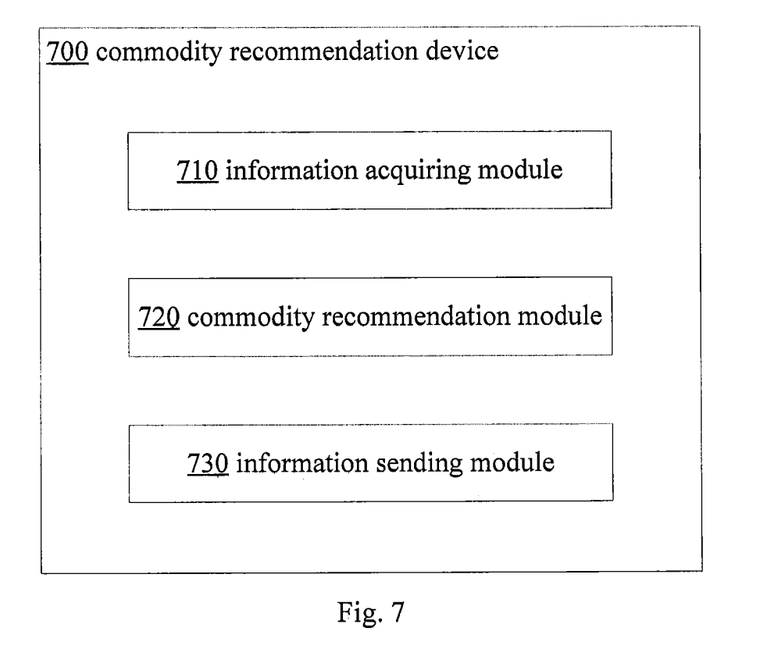
FIG. 7 schematically illustrates a structural block diagram of a commodity recommendation device in accordance with some embodiments of the present disclosure.

FIG. 7 schematically illustrates a structural block diagram of a commodity recommendation device according to some embodiments of the present disclosure. The commodity recommendation method according to some embodiments of the present disclosure can be performed by the commodity recommendation device as shown in FIG. 7. As shown in FIG. 7, the commodity recommendation device 700 comprises:

an information acquiring module 710 configured to receive location information of a user to whom the commodity is to be recommended;

a commodity recommendation module 720 configured to perform commodity recommendation according to the location information of the user to whom the commodity is to be recommended; and an information sending module 730 configured to send the recommended commodity information to the user to whom the commodity is to be recommended.

In the commodity recommendation device according to some embodiments of the present disclosure, the commodity recommendation module comprises:

a hotspot area acquiring module configured to acquire a hotspot area;

a location determining module configured to determine, according to the location information of the user to whom the commodity is to be recommended, whether the user to whom the commodity is to be recommended is in the hotspot area;

a commodity recommendation first sub-module configured to perform commodity recommendation based on historical shopping behaviors of a plurality of first sample users when the user to whom the commodity is to be recommended is not in the hotspot area; and a commodity recommendation second sub-module configured to perform commodity recommendation based on the historical shopping behaviors of the plurality of first sample users and sales volume of commodities in the hotspot area when the user to whom the commodity is to be recommended is in the hotspot area;

where the plurality of first sample users comprises the user to whom the commodity is to be recommended.

In the commodity recommendation device according to some embodiments of the present disclosure, the hotspot area acquiring module comprises:

a location acquiring module configured to acquire location coordinates of a plurality of second sample users;

a clustering module configured to use a clustering algorithm to cluster the plurality of second sample users based on the location coordinates of the plurality of second sample users to obtain at least one second sample user class; and a hotspot area determining module configured to determine the hotspot area according to the at least one second sample user class, where a center point coordinate $(\bar{x}, \bar{y})$ and a radius r of the hotspot area corresponding to each second sample user class are determined by the following formulas:

$$\bar{x}=(x_1+x_2+\ldots+x_n)/n, \bar{y}=(y_1+y_2+\ldots+y_n)/n, \text{ and}$$

$$r = 2 \times \sqrt{\frac{\sum_{i=1}^{n}\{(x_i - \bar{x})^2 + (y_i - \bar{y})^2\}}{n}},$$

where n is a number of users in the second sample user class corresponding to the hotspot area, and $(x_i, y_i)$ is a location coordinate of the i-th user in the second sample user class corresponding to the hotspot area, and i=1, ..., n.

In the commodity recommendation device according to some embodiments of the present disclosure, the commodity recommendation first sub-module comprises:

a data acquiring module configured to acquire historical shopping behavior data of the plurality of first sample users;

a scoring matrix determining module configured to determine a first sample user-commodity scoring matrix according to the historical shopping behavior data;

a prediction scoring matrix determining module configured to determine a first sample user-commodity prediction scoring matrix by using a matrix decomposition-based collaborative filtering algorithm according to the first sample user-commodity scoring matrix; and a commodity recommendation third sub-module configured to perform commodity recommendation to the user to whom the commodity is to be recommended according to the first sample user-commodity prediction scoring matrix.

Figure 8:
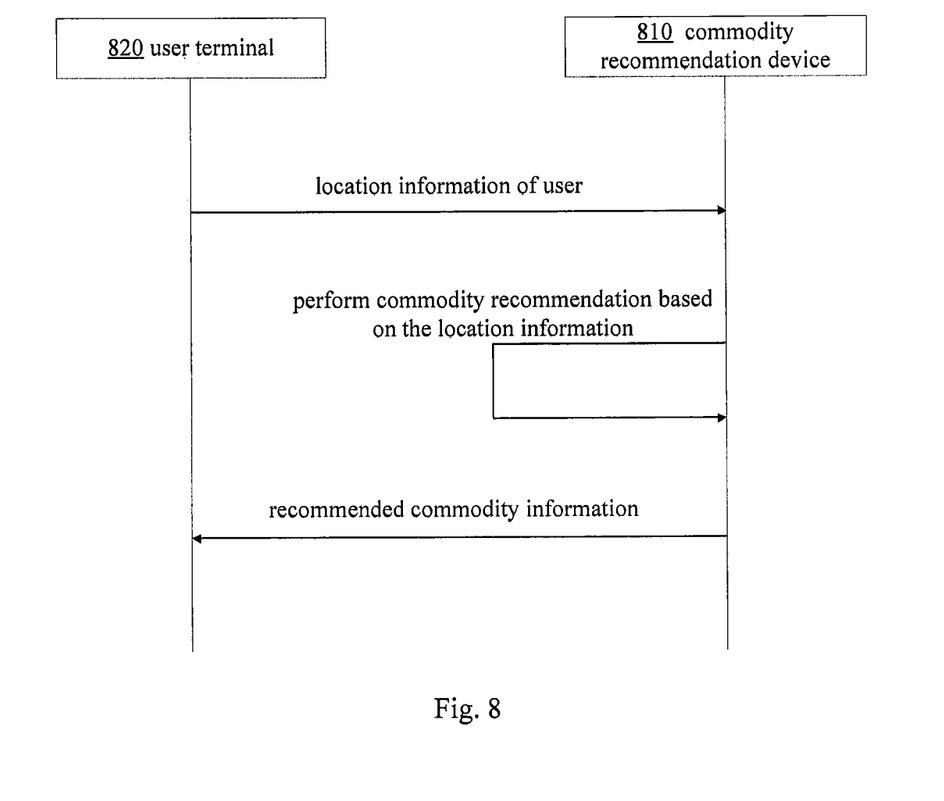
FIG. 8 schematically illustrates a structural diagram of a commodity recommendation system in accordance with some embodiments of the present disclosure.

FIG. 8 schematically illustrates a structural diagram of a commodity recommendation system in accordance with some embodiments of the present disclosure. As shown in FIG. 8, the commodity recommendation system comprises a commodity recommendation device 810 and a user terminal 820 communicatively coupled to the commodity recommendation device 810, wherein:

the user terminal 820 is configured to send location information of a user to whom the commodity is to be recommended to the commodity recommendation device;

the commodity recommendation device 810 is configured to receive the location information of the user to whom the commodity is to be recommended, perform commodity recommendation according to the location information of the user to whom the commodity is to be recommended, and send the recommended commodity information to the user to whom the commodity is to be recommended; and the user terminal 820 is further configured to receive and display the recommended commodity information from the commodity recommendation device 810.

The present disclosure also relates to one or more computer storage media having a computer program stored thereon that, when executed, implements the commodity recommendation method in accordance with some embodiments of the present disclosure as described above. Furthermore, the present disclosure also relates to a computing device comprising: a processor; and a memory having computer readable instructions stored thereon that, when executed by the processor, causes the computing device to perform the commodity recommendation method according to some embodiments of the present disclosure as described above.

In the description of the present specification, the descriptions of the terms "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Any process or method description in the flowcharts or otherwise described herein can be understood to represent a module, segment or portion of code comprising one or more executable instructions for implementing the steps of a custom logic function or process. And the scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that, in the claims, the term "comprising/including" and the variants thereof does not exclude the presence of other elements or steps that are not stated in the claims; The wording "a" or "an" does not exclude a plurality.

While particular embodiments of the present disclosure has been shown and described, it will be apparent to those skilled in the art that, a number of changes and modifications can be made in its broader aspects without departing from the disclosure. Therefore, the appended claims shall comprise all such changes and modifications within their scopes, as falling within the true spirit and scope of this disclosure.

The invention claimed is:

1. A device for acquiring commodity information, comprising:
    a transceiver configured to receive location information of a target user from a GPS circuit of a user terminal, through a wired or wireless network;
    a determining circuit configured to determine commodity information for the target user according to the location information of the target user received from the user terminal, wherein the transceiver is further configured to transmit the commodity information to the user terminal of the target user through the wired or wireless network; and
    a display configured to display the commodity information that was transmitted through the wired or wireless network to the target user,
    wherein the determining circuit is further configured to determine commodity information for the target user by performing operations comprising:
    acquiring a hotspot area;
    determining whether the target user is in the hotspot area according to the location information of the target user;
    determining commodity information for the target user based on historical shopping behaviors of a plurality of first sample users when the target user is not in the hotspot area, wherein the plurality of first sample users comprise the target user; and
    determining commodity information for the target user based on the historical shopping behaviors of the plurality of first sample users and sales volume of commodities in the hotspot area when the target user in the hotspot area,
    wherein the determining whether the target user is in the hotspot area according to the location information of the target user comprises:
        calculating a Euclidean distance between location coordinates of the target user and a center point of the hotspot area; and
        comparing the Euclidean distance to a radius of the hotspot area such that if the Euclidean distance is greater than the radius, the target user being not in the hotspot area, and otherwise, the target user being in the hotspot area.

2. The device of claim 1, wherein the acquiring a hotspot area comprises:
    acquiring location coordinates of a plurality of second sample users;
    using a clustering algorithm to cluster the plurality of second sample users based on the location coordinates of the plurality of second sample users to obtain at least one second sample user class; and
    determining the hotspot area according to the at least one second sample user class, wherein a center point coordinate ($\bar{x}$, $\bar{y}$) and a radius r of the hotspot area corresponding to each second sample user class are determined by formulas:

$$\bar{x} = (x_1 + x_2 + \ldots + x_n)/n, \bar{y} = (y_1 + y_2 + \ldots + y_n)/n, \text{ and}$$

$$r = 2 \times \sqrt{\frac{\sum_{i=1}^{n} \{(x_i - \bar{x})^2 + (y_i - \bar{y})^2\}}{n}},$$

wherein n is a number of users in the second sample user class corresponding to the hotspot area, and ($x_i$, $y_i$) is a location coordinate of an i-th user in the second sample user class corresponding to the hotspot area, and i=1, . . . , n.

3. The device of claim 1, wherein the determining commodity information for the target user based on historical shopping behaviors of a plurality of first sample users when the target user is not in the hotspot area comprises:

acquiring historical shopping behavior data of the plurality of first sample users;

determining a first sample user-commodity scoring matrix according to the historical shopping behavior data;

determining a first sample user-commodity prediction scoring matrix by using a matrix decomposition-based collaborative filtering algorithm according to the first sample user-commodity scoring matrix; and determining commodity information for the target user according to the first sample user-commodity prediction scoring matrix.

4. A method for acquiring commodity information, comprising:

receiving location information of a target user by a transceiver, from a GPS circuit of a user terminal, through a wired or wireless network;

determining commodity information for the target user according to the location information of the target user that was received from the user terminal, wherein the transceiver is configured to transmit the commodity information to the user terminal of the target user through the wired or wireless network; and displaying the commodity information that was transmitted through the wired or wireless network to the target user, wherein the determining commodity information for the target user according to the location information of the target user comprises:

acquiring a hotspot area;

determining whether the target user is in the hotspot area according to the location information of the target user;

determining commodity information for the target user based on historical shopping behaviors of a plurality of first sample users when the target user is not in the hotspot area, wherein the plurality of first sample users comprise the target user; and determining commodity information for the target user based on the historical shopping behaviors of the plurality of first sample users and sales volume of commodities in the hotspot area when the target user in the hotspot area, wherein the determining whether the target user is in the hotspot area according to the location information of the target user comprises:

calculating a Euclidean distance between location coordinates of the target user and a center point of the hotspot area; and comparing the Euclidean distance to a radius of the hotspot area such that if the Euclidean distance is greater than the radius, the target user being not in the hotspot area, and otherwise, the target user being in the hotspot area.

5. The method of claim 4, wherein the acquiring a hotspot area comprises:

acquiring location coordinates of a plurality of second sample users;

using a clustering algorithm to cluster the plurality of second sample users based on the location coordinates of the plurality of second sample users to obtain at least one second sample user class; and determining the hotspot area according to the at least one second sample user class, wherein a center point coordinate $(\bar{x}, \bar{y})$ and a radius r of the hotspot area corresponding to each second sample user class are determined by formulas:

$\bar{x}=(x_1+x_2+\ldots+x_n)/n$, $\bar{y}=(y_1+y_2+\ldots+y_n)/n$, and $$r = 2 \times \sqrt{\frac{\sum_{i=1}^{n} \{(x_i - \bar{x})^2 + (y_i - \bar{y})^2\}}{n}},$$

where n is a number of users in the second sample user class corresponding to the hotspot area, and $(x_i, y_i)$ is a location coordinate of an i-th user in the second sample user class corresponding to the hotspot area, and i=1, ..., n.

6. The method of claim 4, wherein the determining commodity information for the target user based on historical shopping behaviors of a plurality of first sample users comprises:

acquiring historical shopping behavior data of the plurality of first sample users;

determining a first sample user-commodity scoring matrix according to the historical shopping behavior data;

determining a first sample user-commodity prediction scoring matrix by using a matrix decomposition-based collaborative filtering algorithm according to the first sample user-commodity scoring matrix; and determining commodity information for the target user according to the first sample user-commodity prediction scoring matrix.

7. The method of claim 6, wherein the plurality of first sample users are m first sample users U1, ..., Um, the historical shopping behaviors of the plurality of first sample users involve n of commodities V1, ..., Vn, and the determining a first sample user-commodity scoring matrix according to the historical shopping behavior data comprises:

determining scores of each of the first sample users Ui for the commodities V1, ..., Vn according to the historical shopping behavior data, wherein a score of Ui for Vj is null in case that the historical shopping behavior of the first sample user Ui does not involve commodity Vj, where i=1, ..., m, j=1, ..., n; and determining a first sample user-commodity scoring matrix $A_{m \times n}$ according to the score of each of the first sample users Ui for the commodities V1, ..., Vn, wherein an element A(i,j) of the matrix A represents the score of the user Ui for the commodity Vj.

8. The method of claim 7, wherein the determining a first sample user-commodity prediction scoring matrix by using a matrix decomposition-based collaborative filtering algorithm according to the first sample user-commodity scoring matrix comprises:

acquiring matrices $U_{m \times k}$ and $V_{n \times k}$ by using the matrix decomposition-based collaborative filtering algorithm, such that $A \approx U \times V^T$, k<<m, n; and determining the first sample user-commodity prediction scoring matrix A' by formula:

$A'=U \times V^T$, wherein an element A'(i,j) of the matrix A' represents a predicted score of the user Ui for the commodity Vj.

9. The method of claim 8, wherein the determining commodity information for the target user according to the first sample user-commodity prediction scoring matrix comprises:

determining commodity information for the target user according to the scores of the target user in the first sample user-commodity prediction scoring matrix A' for the commodities V1, ..., Vn.

10. The method according to claim 4, wherein the determining commodity information for the target user based on the historical shopping behaviors of the plurality of first sample users and sales volume of commodities in the hotspot area comprises:
ranking commodities in the hotspot area according to the sales volume from high to low, to obtain top ranked N commodities, wherein N is an integer greater than or equal to 1;
acquiring historical shopping behavior data of the plurality of first sample users;
determining a first sample user-commodity scoring matrix according to the historical shopping behavior data;
determining, by using a matrix decomposition-based collaborative filtering algorithm, a first sample user-commodity prediction scoring matrix for the first sample user-commodity scoring matrix; and
determining commodity information for the target user according to the first sample user-commodity prediction scoring matrix and the top ranked N commodities in the hotspot area.

11. The method of claim 10, wherein the determining commodity information for the target user according to the first sample user-commodity prediction scoring matrix and the top ranked N commodities in the hotspot area comprises:
acquiring at least one first commodity information according to the first sample user-commodity prediction scoring matrix, and acquiring at least one second commodity information according to the top ranked N commodities in the hotspot area; and
determining at least one of the first and second commodities information as the commodity information for the target user.

12. The method of claim 6, wherein the matrix decomposition-based collaborative filtering algorithm comprises an alternative least squares matrix decomposition-based collaborative filtering algorithm or a gradient descent matrix decomposition-based collaborative filtering algorithm.

13. The method of claim 4, after the determining commodity information for the target user according to the location information of the target user and before the displaying the commodity information to the target user, performing operations further comprising:
acquiring information of commodity that has been placed in a shopping cart; and
deleting the information of the commodity that has been placed in the shopping cart from the commodity information when the commodity information comprises the information of the commodity.

14. The method of claim 13, wherein the acquiring information of commodity that has been placed in a shopping cart comprises:
acquiring the information of the commodity that has been placed in the shopping cart by using a commodity identification device on the shopping cart.

15. A computing device, comprising:
a processor; and
a memory having computer readable instructions stored thereon that, when executed by the processor, cause the computing device to perform operations comprising:
receiving location information of a target user by a transceiver, from a GPS circuit of a user terminal, through a wired or wireless network;
determining commodity information for the target user according to the location information of the target user that was received from the user terminal, wherein the transceiver is configured to transmit the commodity information to the user terminal of the target user through the wired or wireless network; and
displaying the commodity information that was transmitted through the wired or wireless network to the target user,
wherein the determining commodity information for the target user according to the location information of the target user comprises:
acquiring a hotspot area;
determining whether the target user is in the hotspot area according to the location information of the target user;
determining commodity information for the target user based on historical shopping behaviors of a plurality of first sample users when the target user is not in the hotspot area, wherein the plurality of first sample users comprise the target user; and
determining commodity information for the target user based on the historical shopping behaviors of the plurality of first sample users and sales volume of commodities in the hotspot area when the target user in the hotspot area,
wherein the determining whether the target user is in the hotspot area according to the location information of the target user comprises:
calculating a Euclidean distance between location coordinates of the target user and a center point of the hotspot area; and
comparing the Euclidean distance to a radius of the hotspot area such that if the Euclidean distance is greater than the radius, the target user being not in the hotspot area, and otherwise, the target user being in the hotspot area.

16. A non-transitory computer readable storage medium, comprising computer readable instructions stored thereon that, when executed, perform operations comprising:
receiving location information of a target user by a transceiver, from a GPS circuit of a user terminal, through a wired or wireless network;
determining commodity information for the target user according to the location information of the target user that was received from the user terminal, wherein the transceiver is configured to transmit the commodity information to the user terminal of the target user through the wired or wireless network; and
displaying the commodity information that was transmitted through the wired or wireless network to the target user,
wherein the determining commodity information for the target user according to the location information of the target user comprises:
acquiring a hotspot area;
determining whether the target user is in the hotspot area according to the location information of the target user;
determining commodity information for the target user based on historical shopping behaviors of a plurality of first sample users when the target user is not in the hotspot area, wherein the plurality of first sample users comprise the target user; and
determining commodity information for the target user based on the historical shopping behaviors of the plurality of first sample users and sales volume of commodities in the hotspot area when the target user in the hotspot area, wherein the determining whether the target user is in the hotspot area according to the location information of the target user comprises:

calculating a Euclidean distance between location coordinates of the target user and a center point of the hotspot area; and comparing the Euclidean distance to a radius of the hotspot area such that if the Euclidean distance is greater than the radius, the target user being not in the hotspot area, and otherwise, the target user being in the hotspot area.

* * * * *